(12) United States Patent
Gower et al.

(10) Patent No.: US 7,984,222 B2
(45) Date of Patent: Jul. 19, 2011

(54) SYSTEMS FOR PROVIDING PERFORMANCE MONITORING IN A MEMORY SYSTEM

(75) Inventors: Kevin C. Gower, LeGrangeville, NY (US); Carl E. Love, Beaverton, OR (US); Dustin J. VanStee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/352,990

(22) Filed: Jan. 13, 2009

(65) Prior Publication Data

US 2009/0119466 A1    May 7, 2009

Related U.S. Application Data

(63) Continuation of application No. 11/461,567, filed on Aug. 1, 2006, now Pat. No. 7,493,439.

(51) Int. Cl.
| | |
|---|---|
| G06F 13/14 | (2006.01) |
| G06F 13/24 | (2006.01) |
| G06F 12/06 | (2006.01) |
| G06F 13/00 | (2006.01) |

(52) U.S. Cl. ............. 710/305; 710/260; 711/5; 711/154
(58) Field of Classification Search .................. 710/305, 710/260; 711/5, 154
See application file for complete search history.

(56) References Cited

U.S. PATENT DOCUMENTS

| | | | | |
|---|---|---|---|---|
| 6,081,868 | A * | 6/2000 | Brooks | 711/3 |
| 6,601,149 | B1 * | 7/2003 | Brock et al. | 711/154 |
| 6,918,007 | B2 * | 7/2005 | Chang et al. | 711/114 |
| 7,216,196 | B2 * | 5/2007 | Jeddeloh | 711/5 |
| 7,694,152 | B2 * | 4/2010 | Carr | 713/189 |
| 2003/0028701 | A1 * | 2/2003 | Rao et al. | 710/305 |
| 2005/0144403 | A1 | 6/2005 | Jeddeloh | |
| 2006/0080584 | A1 * | 4/2006 | Hartnett et al. | 714/733 |
| 2006/0288172 | A1 * | 12/2006 | Lee et al. | 711/137 |

* cited by examiner

*Primary Examiner* — Mark Rinehart
*Assistant Examiner* — Christopher A Daley
(74) *Attorney, Agent, or Firm* — Cantor Colburn LLP

(57) ABSTRACT

Systems for providing performance monitoring in a memory system. The memory system includes a memory controller, a plurality of memory devices, a memory bus and a memory hub device. The memory controller receives and responds to memory access requests. The memory bus is in communication with the memory controller. The memory hub device is in communication with the memory bus. The memory hub device includes a memory interface for transferring one or more of address, control and data information between the memory hub device and the memory controller via the memory bus. The memory hub device also includes a memory device interface for communicating with the memory devices. The memory hub device further includes a performance monitor for monitoring and reporting one or more of memory bus utilization, memory device utilization, and performance characteristics over defined intervals during system operation.

16 Claims, 9 Drawing Sheets

SYSTEMS FOR PROVIDING PERFORMANCE MONITORING IN A MEMORY SYSTEM

CROSS-REFERENCE TO RELATED APPLICATION

This application is a continuation of U.S. patent application Ser. No. 11/461,567, filed Aug. 1, 2006, the contents of which are incorporated by reference herein in their entirety.

BACKGROUND

This invention relates generally to computer memory, and more particularly to providing performance monitoring in a memory system.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. Nos. 5,513,135, 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

FIG. 5 depicts a contemporary system composed of an integrated processor chip 500, which contains one or more processor elements and an integrated memory controller 510. In the configuration depicted in FIG. 5, multiple independent cascade interconnected memory busses 506 are logically aggregated together to operate in unison to support a single independent access request at a higher bandwidth with data and error detection/correction information distributed or "striped" across the parallel busses and associated devices. The memory controller 510 attaches to four narrow/high speed point-to-point memory busses 506, with each bus 506 connecting one of the several unique memory controller interface channels to a cascade interconnected memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a block diagram of a memory hub device 504 including a link interface 604 for providing the means to re-synchronize, translate and re-drive high speed memory access information to associated DRAM devices 509 and/or to re-drive the information downstream on memory bus 506 as applicable based on the memory system protocol. The information is received by the link interface 604 from an upstream memory hub device 504 or from a memory controller 510 (directly or via an upstream memory hub device 504) via the memory bus 506. The memory device data interface 615 manages the technology-specific data interface with the memory devices 509 and controls the bi-directional memory device data bus 608. The memory hub control 613 responds to access request packets by responsively driving the memory device 509 technology-specific address and control bus 614 (for memory devices in RANK0 501) or address and control bus 614' (for memory devices in RANK1 616) and directing the read data flow 607 and write data flow 610 selectors.

The link interface 604 in FIG. 6 decodes the packets and directs the address and command information directed to the local hub device 504 to the memory hub control 613. Memory write data from the link interface 604 can be temporarily stored in the write data queue 611 or directly driven to the memory devices 509 via the write data flow selector 610 and internal bus 612, and then sent via internal bus 609 and memory device data interface 615 to memory device data bus 608. Memory read data from memory device(s) 509 can be queued in the read data queue 606 or directly transferred to the link interface 604 via internal bus 605 and read data selector 607, to be transmitted on the upstream bus 506 as a read reply packet.

In high bandwidth cascaded memory architectures, it is highly desirable to measure memory parameters such as channel bandwidth under no load and heavy load conditions to make sure that the interface is being optimally utilized and to validate system performance predictions. Historically, it is the job of the performance and test teams to make sure that the system is configured and being used optimally. A performance benchmark can be executed to measure different memory latency and performance characteristics, but much of the behavior of the interface would have to be inferred from the runtimes of various tests. There is a need to validate the memory interface during runtime (under application conditions) and monitor the multiple interfaces of the whole system to understand where bottlenecks in the system may be occurring. It would be desirable to be able to use these results to program optimized register settings in the current system and/or to modify the design and modify future designs/systems to eliminate those bottlenecks.

SUMMARY

Embodiments include a memory system for storing and retrieving data for a processing system. The memory system includes a memory controller, a plurality of memory devices, a memory bus and a memory hub device. The memory controller receives and responds to memory access requests. The memory bus is in communication with the memory controller. The memory hub device is in communication with the memory bus. The memory hub device includes a memory interface for transferring one or more of address, control and data information between the memory hub device and the memory controller via the memory bus. The memory hub device also includes a memory device interface for communicating with the memory devices. The memory hub device further includes a performance monitor for monitoring and reporting one or more of memory bus utilization, memory device utilization, and performance characteristics over defined intervals during system operation.

Embodiments also include a memory system with a plurality of memory devices and a memory hub device in communication with a memory bus. The memory hub device includes a memory interface for transferring one or more of address, control and data information between the memory hub device and a memory controller via a memory bus. The memory hub device also includes a memory device interface for communicating with the memory devices. The memory hub device further includes a performance monitor for monitoring and reporting one or more of memory bus utilization, memory device utilization, and performance characteristics over defined intervals during subsystem operation.

Embodiments also include a memory controller for receiving and responding to memory access requests. The memory controller includes a memory interface for transferring one or more of address, control and data information between the memory controller and one or more hub devices via a memory bus. The memory controller also includes a performance monitor for monitoring and reporting one or more of memory bus utilization and performance characteristics over defined intervals during system operation.

Further embodiments include a memory hub device including a memory interface, a memory device interface and performance monitor. The memory interface transfers one or more of address, control and data information between the memory hub device and a memory controller via a memory bus. The memory device interface communicates with the memory devices. The performance monitor monitors and reports one or more of memory bus utilization, memory device utilization, and performance characteristics over defined intervals during subsystem operation.

Further embodiments also include a method of providing performance monitoring. The method includes detecting the occurrence of selected events in a hub device, the events characterized by type. The number of detected events of each type and elapsed time between any related events are recorded. The detecting and recording are continued for a defined period of time or until an event count threshold has been reached. The recorded data is stored in an event frequency array after the defined period of time or when the event count threshold has been reached.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
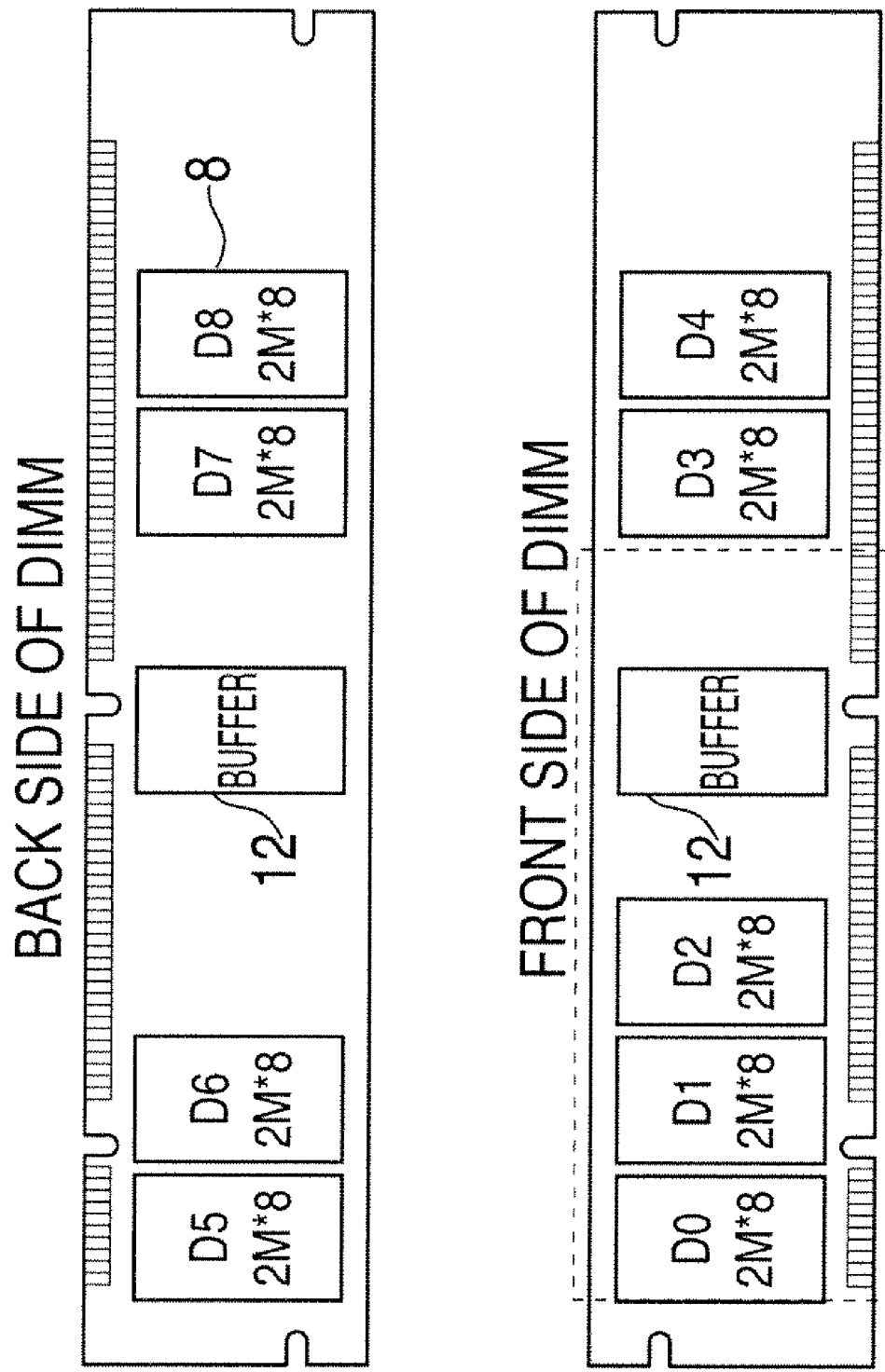
FIG. 1 depicts an exemplary early synchronous memory module.
Figure 2:
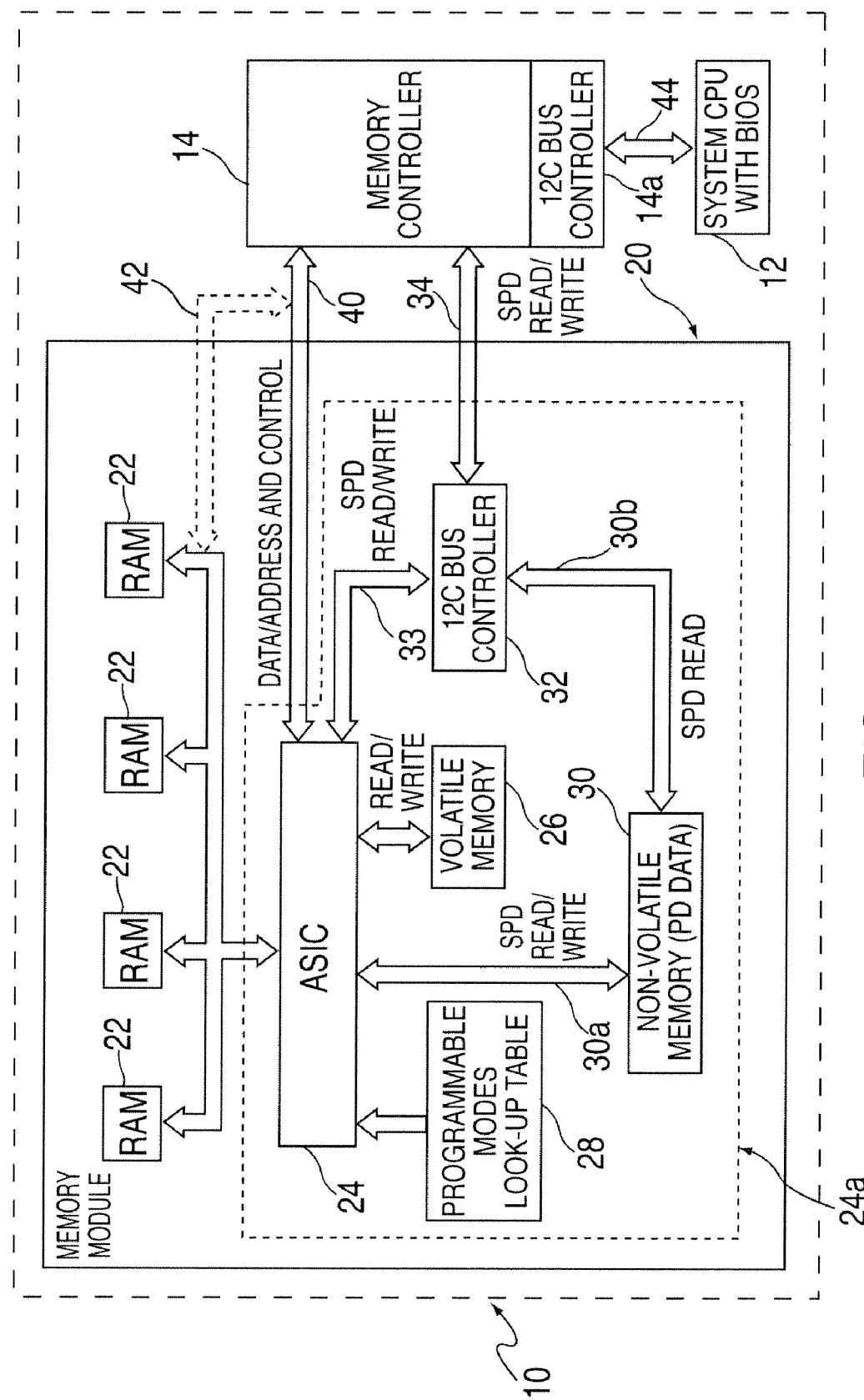
FIG. 2 depicts an exemplary computer system with a fully buffered synchronous memory module that is directly connected to a memory controller.
Figure 3:
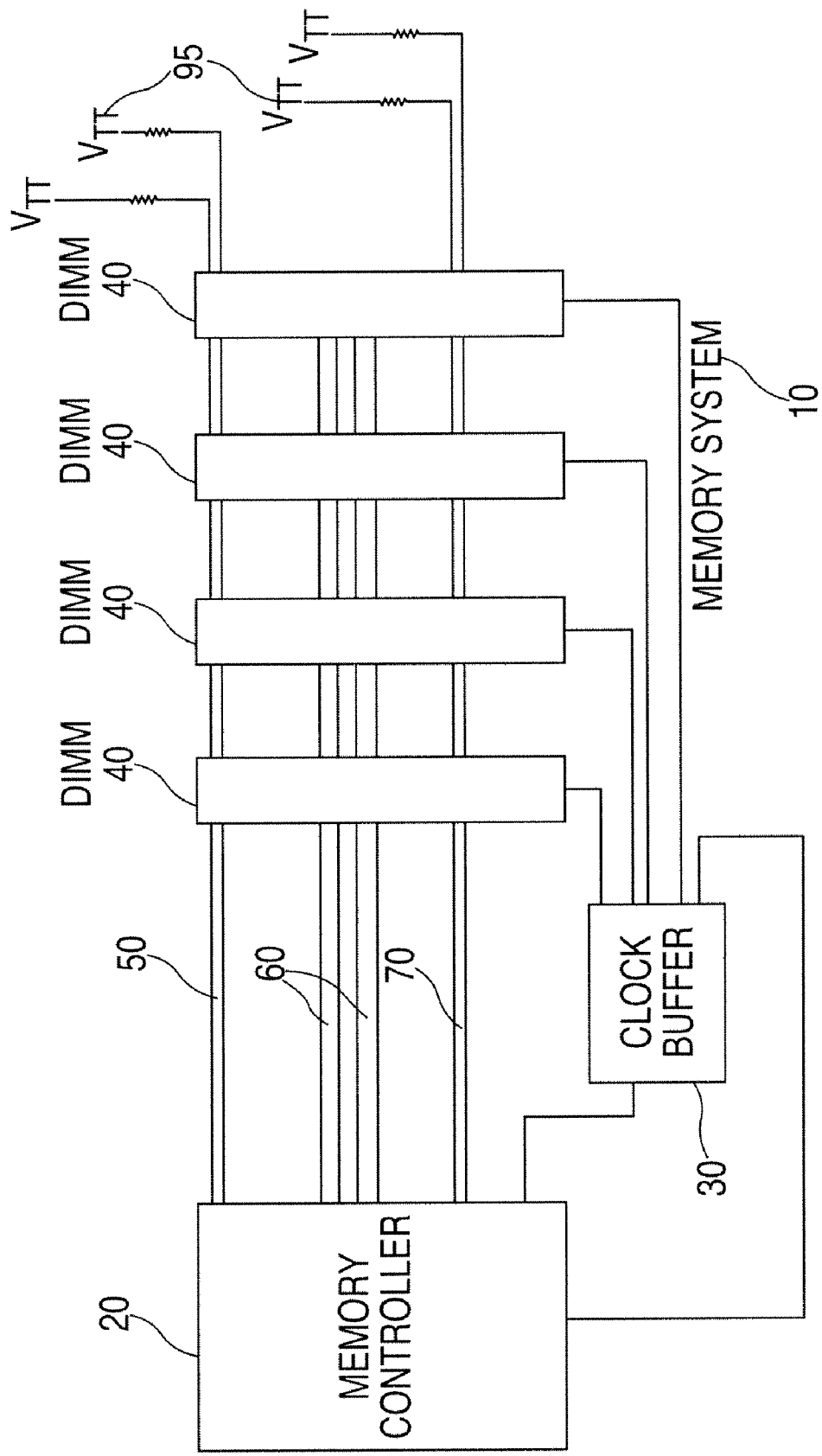
FIG. 3 depicts an exemplary memory system, shown with a single, traditional multi-drop stub bus.
Figure 4:
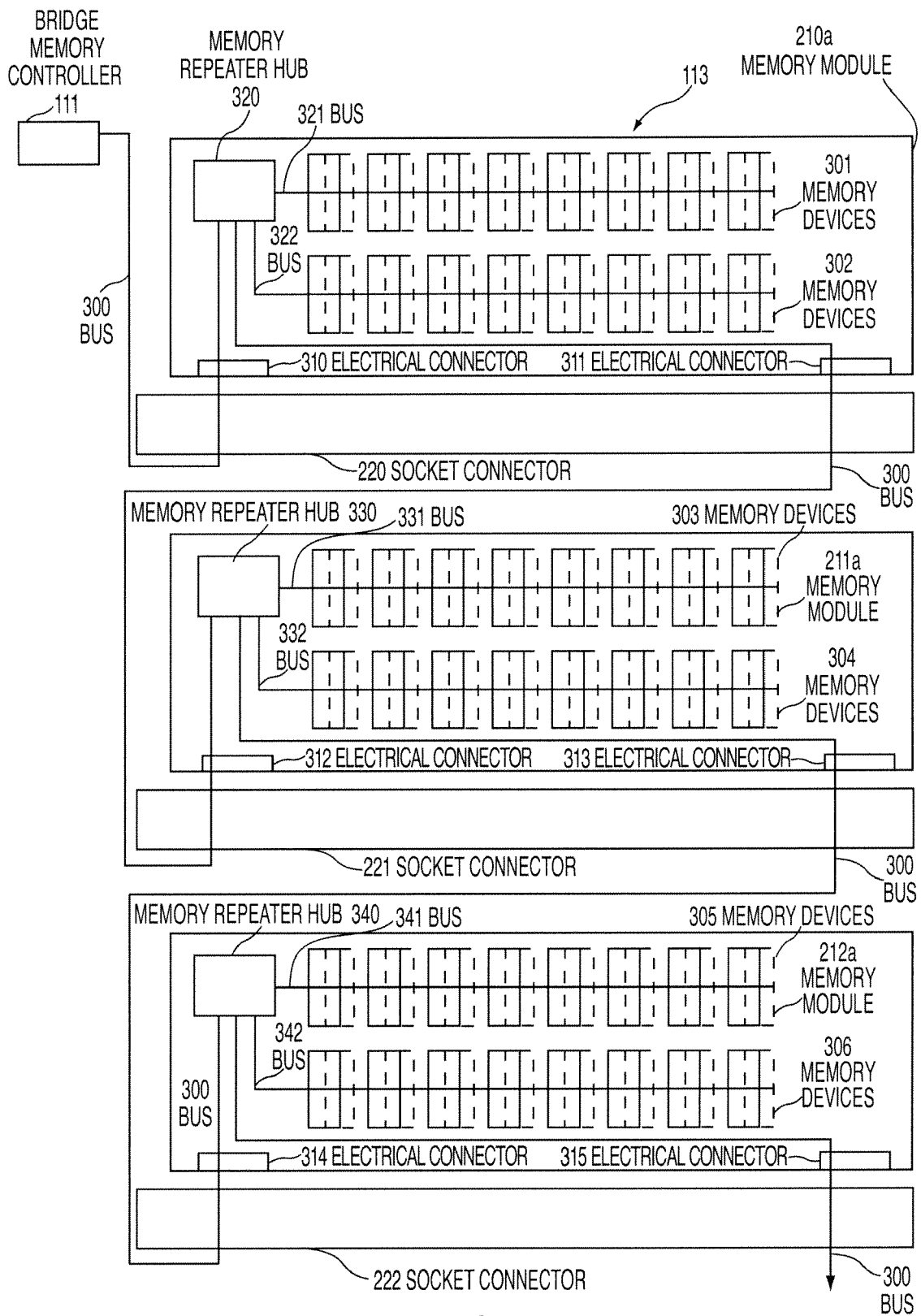
FIG. 4 depicts a fully buffered synchronous memory module and system structure, where the fully buffered synchronous memory module includes a repeater function.
Figure 5:
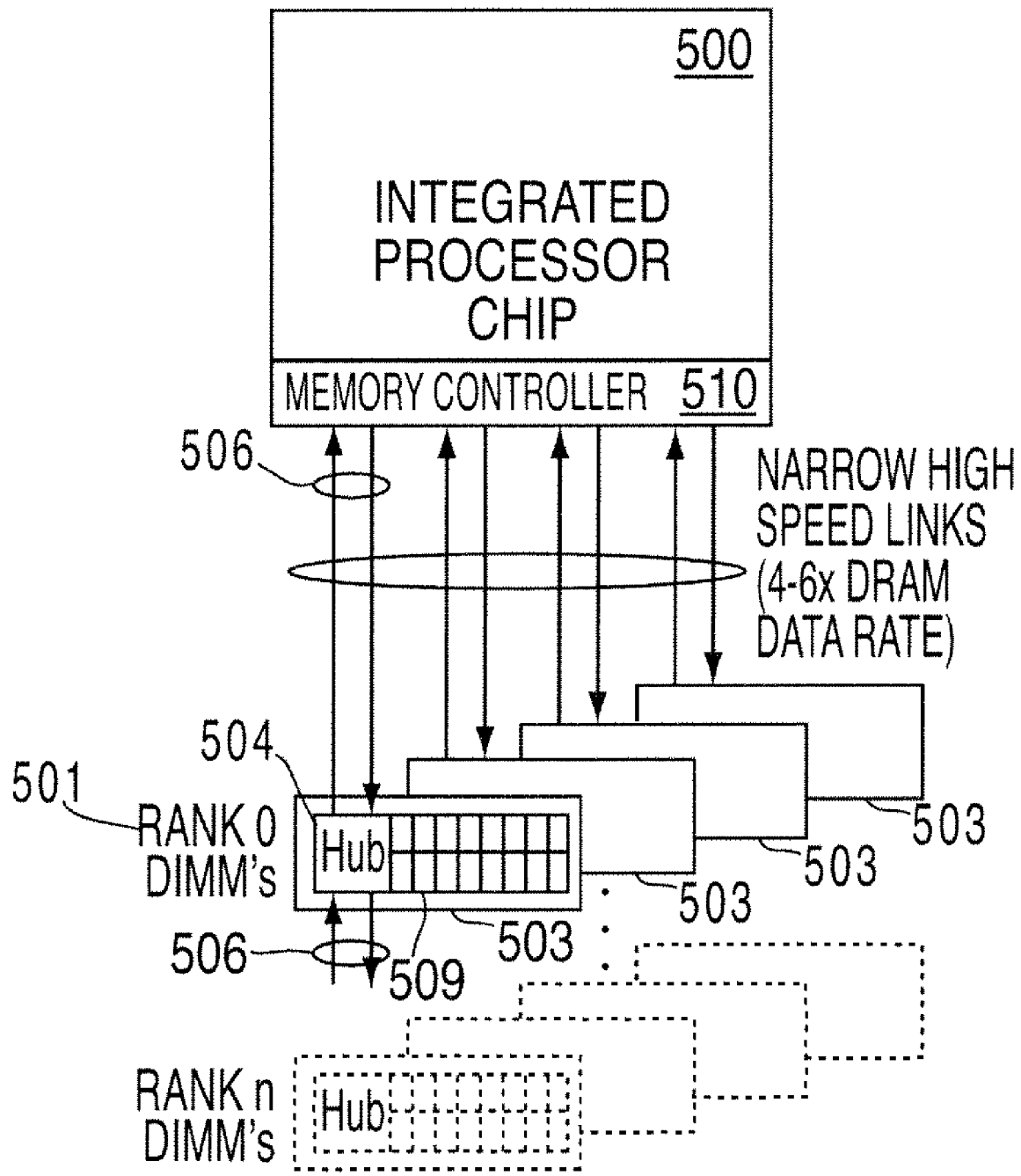
FIG. 5 depicts a block diagram of a computer memory system which includes multiple independent cascade interconnect memory interface busses that operate in unison to support a single data access request.

Exemplary embodiments implement a memory hub performance monitoring function. Circuitry for performing the performance monitoring may be included in a memory hub device and/or in a memory controller to monitor one or more memory busses. The statistics, or performance characteristics, that may be monitored and reported include, but are not limited to, total bus bandwidth, downstream utilized bus bandwidth, upstream utilized bus bandwidth, minimum read latency, average read latency and/or read to write bandwidth ratio. Each of these performance characteristics is measured in real-time and saved to an array that can be interrogated, and the contents analyzed, to determine the performance of the system under different loads.

As used herein, the term "downstream utilized bus bandwidth" refers to the amount of time that the downstream bus is being used for sending information such as addresses, commands and data, divided by the total amount of time the downstream bus is available. As used herein, the term "upstream utilized bus bandwidth" refers to the amount of time that the upstream bus is being used for receiving information such as data and status, divided by the total amount of time the bus is available. As used herein, the term "total bus utilized bandwidth" refers to the amount of time that the upstream and downstream bus is being used, divided by the total amount of time the busses are available. As used herein, the term "read latency" refers to the amount of time it takes for a read request to return data. As used herein, the term "average read latency" refers to a number derived over a period of time that takes the sum of read latencies, and divides that sum by the number of read commands that were processed by the memory system. As used herein, the term "read to write bandwidth ratio" refers to the upstream utilized bus bandwidth divided by the downstream utilized bus bandwidth. As used herein, the term "trace array" refers to an array of storage elements used to capture bus activity inside computer chips. The bus that is being traced is sampled every clock cycle, with the bus contents related to a given clock cycle stored in the array of storage elements. The trace array has configurable mechanisms to start and stop the trace, and may include mechanisms to compress the traced data. A trace array is generally used for debugging system hardware.

As used herein, the term "event counter" refers to a counter that records the number of specific bus conditions. The bus conditions that cause the event counter to increment are configurable. As used herein, the term "event stop trigger" refers to a condition that causes the trace array to stop recording data. The condition occurs when a counter exceeds a programmed threshold (also referred to as an event count threshold). As used herein, the term "event frequency array" refers to an array of storage elements used to record event counter and running sum values along with the corresponding amount of time in which the counters were active. The event frequency array is used to calculate rates of occurrences. As used herein, the term "deadlock" refers to two or more processes being unable to proceed because each is waiting for one of the other processes to take some action. As used herein, the term "deterministic" refers to a system whose time evolution can be predicted exactly. As used herein, the term "histogram" refers to a bar chart representing a frequency distribution, with the heights of the bars representing observed frequencies. As used herein, the term "memory interface" refers to the one or more signals which enable the transfer of such information as address, command and data between a memory controller and a hub, and/or between one or more hubs.

Exemplary embodiments monitor ("snoop") the input address and command bus stream, record the command stream in a trace array and/or log events (e.g., read and write commands) in an event counter array. If a command requires a response, then the amount of time for the response to occur will also be recorded by a counter whose interval bounds correspond to that response time. From this data, it is possible to generate a histogram of response times. A running sum of response times is also compiled so that an average latency can be calculated.

After a programmed period of time, all the count events (from event counter array(s)) and running sums are logged into an event frequency array. This mode of operation is referred to herein as the "fixed timer mode." After the events are logged, the counters and running sums are reset and the event frequency array load pointer is incremented. This sequence will keep on occurring until the event frequency array is full, a request for this data is received, or the information compilation is terminated for some other reason. Once the event frequency array is full or a request for this data is received, the performance monitor data from the memory hub and/or memory controller will be read and interpreted by system software, hardware developers, system operational/maintenance personnel, etc. Plots of performance attributes such as bandwidth utilization versus latency and bandwidth versus time can be observed.

In a separate mode of operation, the period of time during which measurements are recorded can also change dynamically by only loading the event frequency array when an event counter has reached a threshold. In this case, the window timer value (e.g., the number of clock cycles) will also be loaded (or recorded) into the event frequency array so that rate information can be retained. This mode, referred to herein, as "dynamic time update mode" may be utilized to provide compression capability during times of low bus activity, and therefore more time/events can be recorded. The dynamic time update mode may be used with or instead of the "fixed timer mode" where the counters are reset and the results are logged for a set of data after a fixed window of time (e.g., a fixed timer window setting has been reached).

In exemplary embodiments, "N" allowable events can be counted, consisting of such actions as read requests, read data responses, write data requests, write completion notification, etc. A counter is allocated for each event, and a series of locations in the event frequency array are reserved. When the specific event occurs, the corresponding event counter is incremented. Once the window timer expires (such as via the detection of a set number of clocks, etc), or an overflow event threshold is reached, the counter data is loaded into the event frequency array, and the counters are reset.

For commands that have an associated response such as read data, a histogram structure is created for use in analyzing data responses from the memory system. This histogram has programmable bounds (e.g., programmable number of cycles to complete an operation) for each bin. The term "bin", as used herein, refers to a counter for each bar in the histogram. For example, if one bar in a histogram represents the number of responses that took 5 to 10 cycles and another bar represents responses that took 11 to 15 cycles, there would be two bins, one bin to count the number of responses that took 5 to 10 cycles and another bin to count the number of responses that took 11 to 15 cycles. The histogram can optionally be loaded into the event frequency array as well. If the histogram is loaded into the event frequency array, then the histogram counters are reset for each bin.

In exemplary embodiments, a trace array is also used in conjunction with the event counter circuitry to allow for system debug. The trace array is programmed to sample the input address and command stream (e.g. using a FIFO) and constantly record one or more of the input address and command stream until an event stop trigger occurs. Each event/bin counter has a maximum threshold, or event count threshold, such that when this threshold is exceeded, a stop trace signal is generated. The stop trace signal is sent to the trace array to end the recording of the bus. This can be useful in analyzing traces to find the cause of certain system performance anomalies, and helps the designer and test engineer to understand the mechanisms that are causing system bottlenecks because the trace is stopped at the time when the system is not performing optimally. The traces can subsequently be analyzed to understand the mechanisms that are causing the system degradation. Once the mechanism is understood, the system configuration can be updated, an application can be recoded, and/or the system can be redesigned to modify the performance-limiting attributes.

When full, the event frequency array can be utilized to analyze system behavior over different periods of time. Data that is extracted from the event frequency array can be used to determine bandwidths, utilizations, and average data response times.

Figure 6:
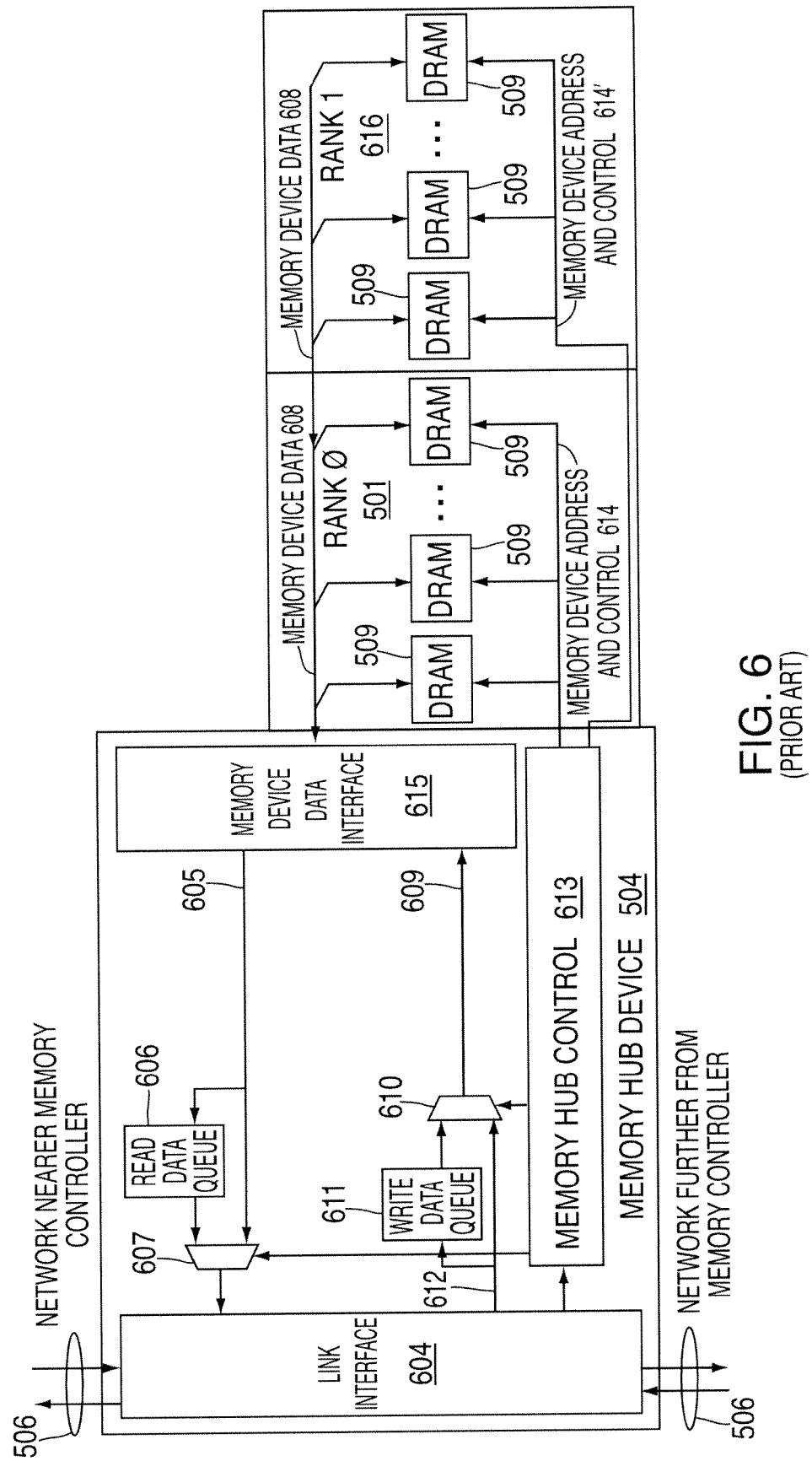
FIG. 6 is a block diagram of an exemplary hub device in a memory subsystem.
Figure 7:
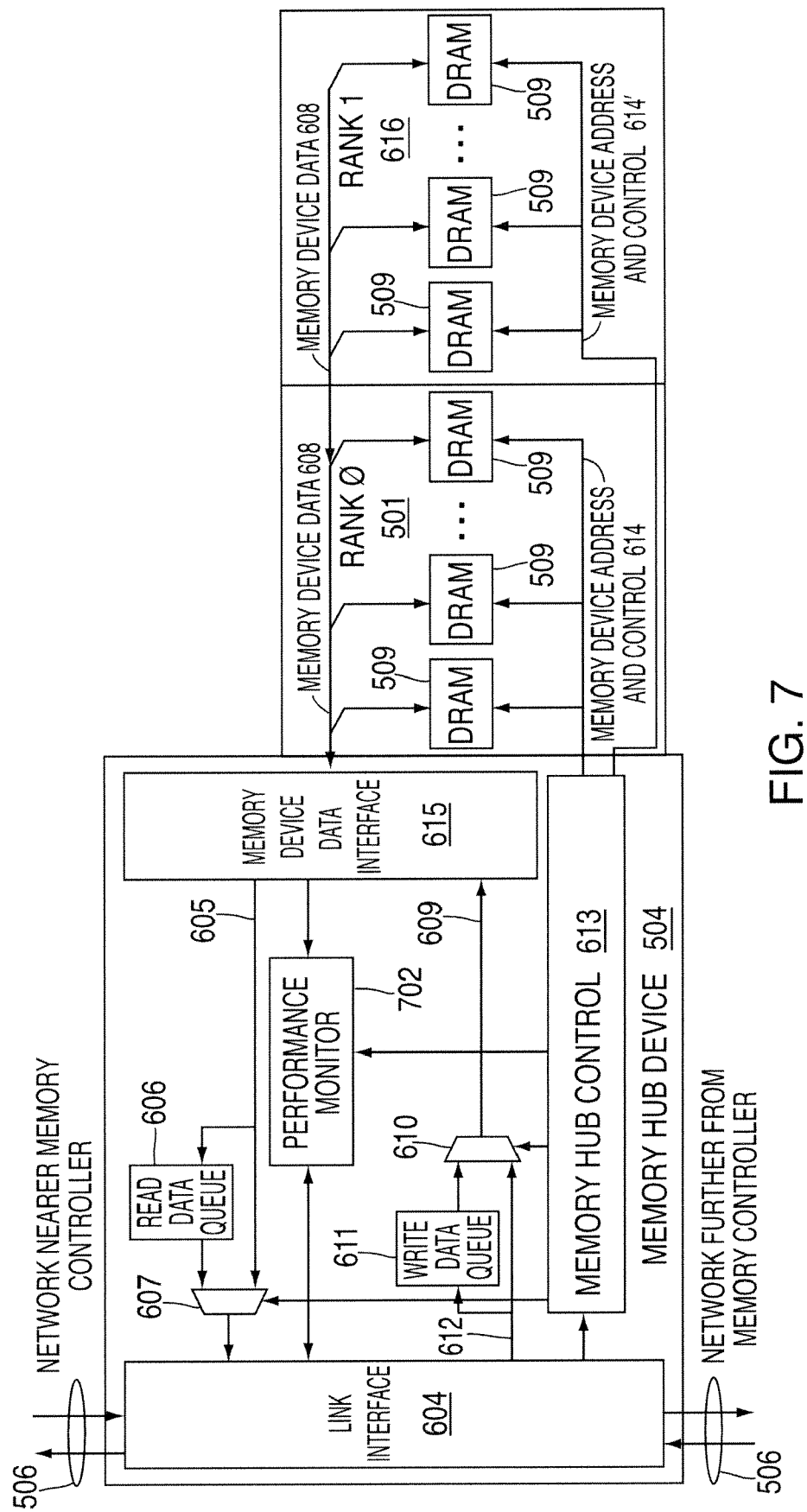
FIG. 7 is a block diagram of an exemplary hub device including performance monitoring logic that may be implemented by exemplary embodiments.

FIG. 7 is a block diagram of an exemplary hub device 504 that includes performance monitoring logic 702 that may be implemented by exemplary embodiments. The hub device 504 in FIG. 7 performs the same functions described above with reference to FIG. 6 along with the added function of performance monitoring. The performance monitoring logic 702 may be implemented using hardware and/or software. FIG. 7 includes performance monitoring logic 702 located in the memory hub device 504 for providing the performance monitoring functions described herein. As depicted in FIG. 7, the performance monitoring logic 702 is in communication with the memory hub control 613, the memory device data interface 615 and the link interface 604 allowing it to monitor and capture all activity on the memory bus 506 (both the upstream bus and the downstream bus), the memory device data bus 608 and the memory device address and control bus 614 as well as all commands issued by the memory hub control 613 and all data transfers (reads and write) via the memory device data interface 615.

A detailed description of how the performance monitor logic 702 works is described below using a sample command stream and a possible method for interpreting the data. Important considerations in setting up the performance monitoring include determining the type of read data response method used (determinate or indeterminate), the length of time a command uses on the bus, the commands to be monitored, and the window sample time.

A sample command stream follows in Table 1, which relates to a determinate system in which different commands may require different numbers of cycles but where response times can be predicted exactly. The decoding of the command stream into memory operations is completed in the memory hub and control block 613, and the resulting commands to the one or more memory devices may include decoded address information to identify the memory rank, bank or other selectable portion of the memory. The command stream may be monitored such that any access to any of the memory devices 509 in a memory subsystem is recorded as a single event, or such that an access to a sub-portion of the memory subsystem (e.g. a specific bank or rank) is monitored. Based on the decoding and performance monitoring method used, performance information relative to the subsystem as a whole, or relative to sub-portions of the subsystem can be compiled. An indeterminate system could also be monitored and would generally include tags to permit memory responses to be correlated to requests, and response times would vary due to device and bus utilization and scheduling conflicts. Table 1 includes commands targeted for the hub device where the performance monitoring is occurring. In this example, the data response time refers to the amount of time that elapses between receiving the command at the hub device 504 (e.g., from the downstream bus in the memory bus 506) and providing data back to the data requester (e.g., putting read data onto the upstream bus in memory bus 506).

TABLE 1

| Command Type | Start Time | Data Response Time (Time Units) - Determinate |
|---|---|---|
| Write | 0 | Not Applicable |
| Read | 2 | 10 |
| Read | 3 | 12 |
| Read | 4 | 14 |
| Write | 5 | Not Applicable |
| Write | 17 | Not Applicable |
| Read | 19 | 10 |
| Write | 20 | Not Applicable |
| Read | 21 | 10 |
| Read | 22 | 12 |
| Read | 23 | 14 |
| Write | 24 | Not Applicable |
| Read | 25 | 14 |
| Read | 26 | 16 |
| Read | 29 | 12 |

For this example, which is consistent with a DDR-based memory sub-system operating as a burst of 4, a fixed timer window size of 10 is assumed, the tracking of data is reset after 10 time units, each command uses 1 time unit and its corresponding response (if applicable) uses 2 time units. Using this example the maximum write and read bandwidth would be 10 commands per window, while the maximum read response bandwidth would be 5 responses per window. Other parameter settings (e.g., a window size of 20 cycles) may be implemented depending on the type and granularity of performance data desired. In this example, the completion time for a write command is not tracked, in alternate exemplary embodiments the completion time for the write command is monitored. A possible table representation and analysis of the data would be as follows. The data response time refers to the number of time units (e.g., clock cycles) that it takes to return data to the requester.

TABLE 2

| Event Counter 0 | | |
|---|---|---|
| Command Type | Start Time | Data Response Time (#Time Units) - Determinate |
| Write | 0 | Not Applicable |
| Read | 2 | 10 |
| Read | 3 | 12 |
| Read | 4 | 14 |
| Write | 5 | Not Applicable |

Statistics from Set 0
Write Command Utilization = 2/10 * 100% = 20%
Read Command Utilization = 3/10 * 100% = 30%
Average Read Latency = Sum of Read Latency/Number of Read Commands = 36/3 = 12 time units/read command As described by the statistics for Set 0 (which covers clock cycles 0-9), the downstream bus is utilized 20% of the time for write commands, 30% of the time for read commands, and it takes an average of 12 cycles from the time a read command is received at the hub device until the results are returned to the requester.

TABLE 3

Event Counter 1

| Command Type | Start Time | Data Response Time (#Time Units) - Determinate |
|---|---|---|
| Write | 17 | Not Applicable |
| Read | 19 | 10 |

Statistics from Set 1
Write Command Utilization = 1/10 * 100% = 10%
Read Command Utilization = 1/10 * 100% = 10%
Average Read Latency = Sum of Read Latency/Number of Read Commands = 10/1 = 10 time units/read command As described by the statistics for Set 1 (which covers clock cycles 10-19), the downstream bus is utilized 10% of the time for write commands, 10% of the time for read commands, and it takes an average of 10 cycles from the time a read command is received at the hub device until the results are returned to the requestor.

TABLE 4

Event Counter 2

| Command Type | Start Time | Data Response Time (# Time Units) - Determinate |
|---|---|---|
| Write | 20 | Not Applicable |
| Read | 21 | 10 |
| Read | 22 | 12 |
| Read | 23 | 14 |
| Write | 24 | Not Applicable |
| Read | 25 | 14 |
| Read | 26 | 16 |
| Read | 29 | 12 |

Statistics from Set 2
Write Command Utilization = 2/10 * 100% = 20%
Read Command Utilization = 6/10 * 100% = 60%
Average Read Latency = Sum of Read Latency/Number of Read Commands = 78/6 = 13 time units/read command As described by the statistics for Set 2 (which covers clock cycles 20-29), the downstream bus is utilized 20% of the time for write commands, 60% of the time for read commands, and it takes an average of 13 cycles from the time a read command is received at the hub device until the results are returned to the requestor.

TABLE 5

Event Frequency Array

| | Event counter 0 | Event counter 1 | Event counter 2 |
|---|---|---|---|
| Event 0 (Write) | 2 | 1 | 2 |
| Event 1 (Read) | 3 | 1 | 6 |
| Response Sum | 36 | 10 | 78 |
| Number of Cycles | 10 | 10 | 10 |

Table 5 depicts three sample entries in the event frequency array that could be built to summarize the data collected by the three event counters. The number of cycles refers to the number of cycles, or window time, per event. When full, the event frequency array can be utilized to analyze system behavior over different periods of time. Data that is extracted from the event frequency array can be used to determine bandwidths, utilizations, and average data response times.

Each column in Table 5 contains count information per unit time. Using the example calculations from above, charts showing total utilized bandwidth versus average latency, read utilized bandwidth versus average latency, and write utilized bandwidth versus average latency can be derived from the data in the event frequency array. The data could be charted in a graph and analyzed to determine system bottlenecks and validate memory performance data.

In exemplary embodiments, during bottlenecks, thresholds, or event count thresholds, are set on the event counters to cause the trace array to stop, allowing the user to examine the input command stream that caused the bottleneck. This is of interest when certain command sequences create system deadlocks. Deadlocks cause system latency to dramatically increase. This is generally the case when command sequences are not properly issued and/or re-ordered, or when system applications keep accessing memory in a way that causes one resource to be over-utilized. The command stream captured from the trace array will document the input commands prior to and/or at the exact time of the deadlock situation when the event stop trigger is set to be any read response that exceeds a maximum expected threshold in the read response histogram. In general, a user would want to stop tracing as soon as a very large response time is recorded once, although other exemplary embodiments include the use of a secondary counter threshold, to be used in conjunction with the first threshold time, e.g. such that the trace could be stopped after the first threshold was exceeded 'n' times. This further capability would facilitate analysis of system performance impediments over longer time periods.

The previous example was from a memory system where the response time can be calculated because the memory response time is deterministic. In a memory system where response time is not deterministic, the same data can be tracked, however a tag for each read command must be used and the trace array will be updated with the data response time recorded only when the corresponding data and tag are received from the memory system, resulting in a clearly identifiable memory response. In this case, each outstanding read request has an associated counter. When the read request is completed the response time is saved in an array (or bin) that increments a position in the array (e.g., a histogram of response times is compiled) that corresponds to the response time range. Using this technique, a histogram of response times is generated to summarize the distribution of responses in the memory system. In addition, a running response time total is saved so that an average response time per read (e.g. read latency) can be calculated. This type of data can be used by systems designers to optimize the memory sub-system for the typical read response times, as well as minimize high latency events, if desired.

Figure 8:
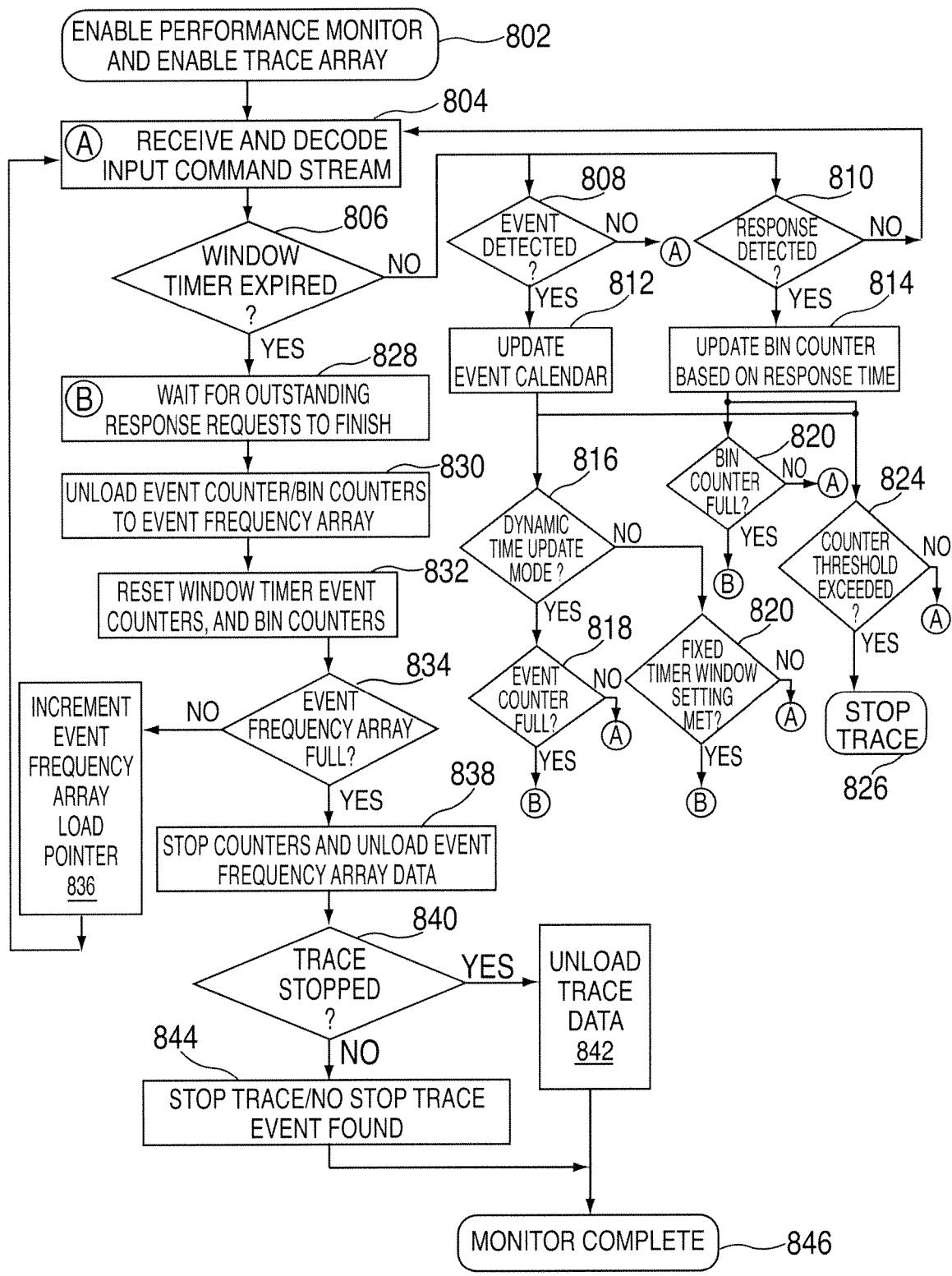
FIG. 8 is a process flow diagram that may be utilized to monitor memory performance in exemplary embodiments.

FIG. 8 is a process flow diagram that may be utilized to monitor memory performance in exemplary embodiments. In exemplary embodiments, the processing depicted FIG. 8 is performed by hardware and/or software instructions located in the performance monitor 702. At block 802, the performance monitor logic 702 is enabled. In addition, the trace array may also be enabled at block 802. At block 804, an input command stream is received and decoded. At block 806, a check is made to determine if a window timer has expired (used when data is collected for a pre-selected period of time and then saved as a set).

If the window timer has expired, as determined at block 806, then the current data has to be saved as a set and the window timer has to be reset to start collecting a new set of data. This processing begins at block 828, by waiting for any outstanding response requests to be completed. For example, this would include waiting for data to be returned for any outstanding read requests. Processing then continues at block 830 with unloading the event counters and any bin counters to the event frequency array. At block 832, the window timer, event counters and bin counters are reset. Note commands arriving during blocks 828 to 836 are not processed as the performance monitoring logic, window timer, and event counter is resetting. However, this is not a problem if the window timer is large relative the amount of time it takes to reset the performance monitor. In alternate embodiments, duplicate performance monitor logic could be implemented such that when one performance monitor is resetting its logic, the other performance monitor could be sampling. Each monitor would have a port that would be able to load the event frequency array, and would also have the ability to stop the trace array.

If the event frequency array is not full (i.e., there is room in the array to record more sets of data), as determined at block 834, then block 836 is performed to increment the event frequency array load pointer and processing loops back up to block 804 to continue receiving input from the input command stream. Alternatively, if the event frequency array is full, as determined at block 834, then processing continues at block 838 to stop the counters and to unload the event frequency array (e.g., to a memory device, to the memory controller, etc.). At block 840, a check is made to determine if a 'stop trace' event has occurred. If a trace is still being executed, then block 844 is performed to stop the trace. Alternatively, if a 'stop trace' event has occurred, then block 842 is performed to unload the trace data (e.g., to a memory device, the memory controller, etc.). The performance monitoring is then completed and exited at block 846.

If the window timer has not expired, as determined at block 806, then processing continues at block 808 and block 810. At block 808, a check is made to determine if an event (e.g., a read command, a write command) has been detected. If an event has not been detected, then processing continues at block 804 to continue to monitor the input stream. In exemplary embodiments, the input stream includes command, address and data being transferred between the memory controller and the hub device, via the memory bus 506. If an event has been detected, as determined at block 808, then block 812 is performed and the event counter corresponding to the event is incremented. Processing then continues at blocks 816 and 824. A check is made at block 816 to determine if the system is operating in the dynamic time update mode. If the system is not operating in dynamic time update mode, then a check is made at block 822 to determine if the fixed timer window setting has been reached. If the fixed timer window setting has not been reached, then processing continues at block 804. If the fixed time window setting has been reached, then processing continues at block 828. Returning to block 816, if the system is operating in dynamic time update mode, then the fixed timer window setting does not apply, and a check is made at block 818 to determine if the event counter is full. If the event counter is not full, then processing continues at block 804 to monitor the input command stream. If the event counter is full, then processing continues at block 828.

At block 824, a check is made to determine if a counter threshold has been exceeded. If a counter threshold has not been exceeded, then processing continues at block 804 to monitor the input command stream. If a counter threshold has been exceeded, then processing continues at block 826 and the trace is stopped. In this manner, when a programmable threshold on any counter (event or bin) is exceeded, then the trace array stops recording the input stream. However, the rest of the performance monitor is still allowed to run to completion. This allows the trace array to capture the events that caused a threshold to be exceeded and then to stop immediately to preserve the command sequence that caused this to occur. An example is setting the programmable threshold to 20 clocks for the read operations in Table 2 (Event Counter 0). A data response time in excess of 20 clocks would result in the counter threshold to be exceeded, and the trace would be stopped. In exemplary embodiments, when the read response (latency) exceeds the counter threshold, the counter threshold for that particular bin counter would be asserted, and cause the trace to stop at the point where it would be possible to examine the stream that caused this case.

In exemplary embodiments for determinate memory systems (i.e., memory systems in which responses can be predicted exactly), memory operations will not generally result in identifiable responses to the commands. Rather, the response times are known by design, and may be affected by the condition of the memory at the time the command is received (e.g. bank active, pre-charged, refresh, power down, etc). In this case, the response time is known to the memory controller and/or hub, and the data response time is loaded based on the known response time. In exemplary embodiments related to indeterminate memory systems (i.e., memory systems in which responses cannot be predicted exactly), memory operations will generally result in identifiable responses to the commands. The response associated with a specific read operation (e.g., using a tag) will result in the counter being loaded with a data response time that is directly related to the actual response time.

At block 810, a check is made to determine if a response to an outstanding command has been detected. If a response has not been detected, then processing continues at block 804. If a response has been detected, the processing continues at block 814 with updating the bin counter corresponding to the response time detected. Next, block 820 and 824 are performed. At block 820, a check is made to determine if the bin counter is full. If the bin counter is not full, then processing continues at block 804. If the bin counter is full, then processing continues at block 828 to save the data into the event frequency array and to start a new set.

Figure 9:
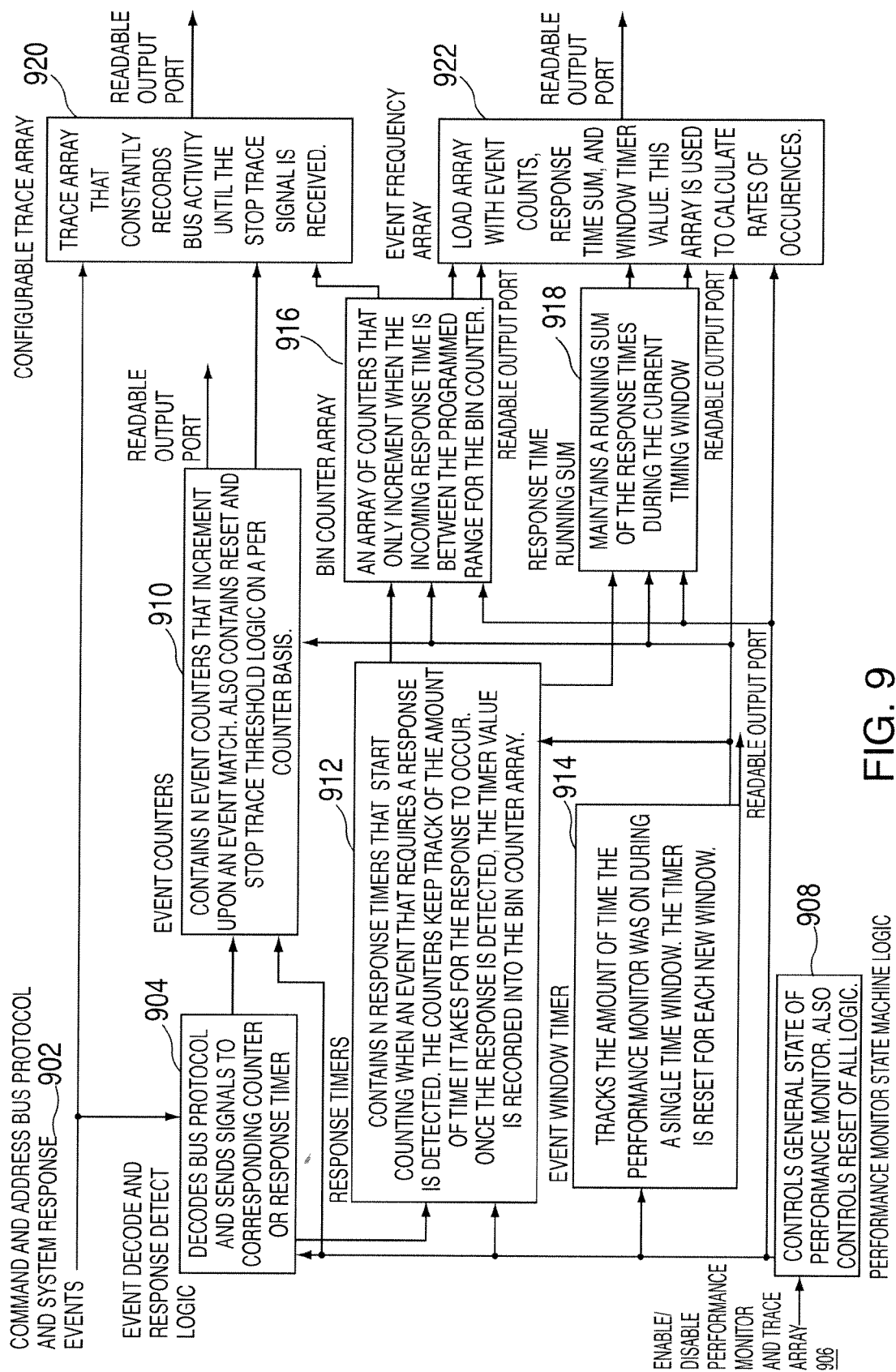
FIG. 9 is a block diagram of memory performance monitoring components that may be implemented in exemplary embodiments.

FIG. 9 is a block diagram of memory performance monitoring components that may be implemented in exemplary embodiments. In exemplary embodiments, the block diagram depicted in FIG. 9 is implemented by the performance monitor logic 702. Inputs to the block diagram include the input command stream (from a bus) and system response events 902, as well as signals 906 to enable/disable the performance monitor and the trace array. The signals 906 are input to the performance monitor state logic block 908 which is in communication with all of the blocks in FIG. 9 to control the general state of the performance monitor and the rest of the logic. The input command stream and system response events 902 are copied into the configurable trace array 920 which can output the data via a readable output port for use in reporting and memory system diagnosis. In addition, the input command stream and system response events 902 are input to the event decode and response detect logic block 904 for decoding the commands and sending signals to counters that correspond to the commands. Output from block 904 may be input to the event counters block 910 and/or to the response timers block 912.

The event window timer block 914 tracks the amount of time (e.g., clock cycles) that the performance monitor has been active, in response to block 908, for the current set of data, or timing window. The bin counter array block 916 increments counters associated with particular response (or other measurement) thresholds and the response time running sum block 918 keeps track of the total response time for all commands during the current timing window, based on inputs from response timers block 912. The event frequency array block 922 contains summary data as described previously and has a readable output port outputting the data. In addition, the event counters block 910, the event window timer block 914, the bin counter array block 916 and the response time running sum block 918 include readable output ports that may be utilized to provide information for diagnostic or other reporting purposes.

The configurable trace array, event frequency array, bin counter array, response time running sum, event window timers, event counters and related circuits associated with the performance monitoring function (referred to collectively herein as performance monitor data) are read via any bus intended for or available for this purpose, including, but not limited, to the SMBus, the I2C bus, and the cascade interconnect bus (or memory bus). One or any combination of these busses (referred to herein as "reporting busses") may be utilized by exemplary embodiments for reading the performance monitor data. The performance monitor data, or information, can be analyzed by the one or more processor chip(s), a service processor, the memory controller or be passed to an external test device or some other execution or processing element for use in analyzing memory system performance and/or identifying aspects of the design or programming for which improvements can be made. The readable output ports may be in the form of a serial interface comprising one or more outputs, or may be in the form of a parallel interface comprised of multiple outputs. In exemplary embodiments, the readable output ports will be connected to an addressable or otherwise selectable interface port which is used to direct one or more of the output ports to the intended interface bus for analysis external to the hub.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g, a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. In exemplary embodiments, the downstream memory bus connects a memory controller to a hub device, or connects a hub device to another hub device further away from the memory controller. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options. In exemplary embodiments, the downstream bus has a protocol that is used to control the memory system.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options. In exemplary embodiments, the upstream bus has a protocol that is used to receive responses from the memory system.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller (s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it at another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices.

Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency(ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to validate a memory interface during runtime (under application conditions) and to monitor the multiple interfaces of the memory system to understand where bottlenecks in the system may be occurring. This information may be utilized to program optimized register settings in a current memory system and/or to modify the design to eliminate the bottlenecks. Exemplary embodiments may be utilized during initial design, during start-up prior to shipment and/or after shipment to help diagnose random fails that only occur in the customer environment.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A memory system for storing and retrieving data for a processing system, the memory system comprising:
    a memory controller for receiving and responding to memory access requests;
    a plurality of memory devices;
    a memory bus in communication with the memory controller; and
    a memory hub device in communication with the memory bus, the memory hub device comprising:
        a memory interface for transferring one or more of address, control and data information between the memory hub device and the memory controller via the memory bus;
        a memory device interface for communicating with the memory devices; and
        a performance monitor for monitoring and reporting one or more of memory bus utilization, memory device utilization, and performance characteristics over defined intervals during system operation, the performance monitor comprising:
            a bin counter for logging an elapsed time between related events, the performance monitor configured to transfer one or more entries in the bin counter into an event frequency array after a defined period of time has elapsed; and
            a trace array for recording one or more of the address, control and data information over time, the performance monitor further configured for setting thresholds on event counters and bin counters, and the trace array is stopped when one or more of the thresholds is exceeded, thereby stopping the trace array upon indication of an unexpected event occurring.

2. The memory system of claim 1 wherein the reporting includes outputting one or more of downstream utilized bus bandwidth, upstream utilized bus bandwidth, average read latency, and read to write bandwidth ratio.

3. The memory system of claim 1 wherein the performance monitor further comprises the event counter array for logging selected events detected in one or more of the address, control and data information.

4. The memory system of claim 3 wherein the selected events include one or more of read commands, write commands and responses to read commands.

5. The memory system of claim 3 wherein the performance monitor loads one or more entries in the event counter array into the event frequency array after one or more of a defined period of time has elapsed or an event count threshold has been reached.

6. The memory system of claim 5 wherein the performance monitor further resets the event counter array and increments an event frequency array load pointer.

7. The memory system of claim 1 wherein the related events include a read command and a response to the read command.

8. The memory system of claim 1 wherein the performance monitor further resets the bin counter and increments an event frequency array load pointer.

9. The memory system of claim 1 wherein the memory system is a determinate memory system.

10. The memory system of claim 1 wherein the memory system is an indeterminate memory system.

11. The memory system of claim 1 wherein performance monitor data is read by one or more reporting buses.

12. A memory subsystem comprising:
    a plurality of memory devices; and
    a memory hub device in communication with a memory bus, the memory hub device comprising:
        a memory interface for transferring one or more of address, control and data information between the memory hub device and a memory controller via a memory bus;
        a memory device interface for communicating with the memory devices; and
        a performance monitor for monitoring and reporting one or more of memory bus utilization, memory device utilization, and performance characteristics over defined intervals during subsystem operation, the performance monitor comprising:
- a bin counter for logging an elapsed time between related events, the performance monitor configured to transfer one or more entries in the bin counter into an event frequency array after a first defined period of time has elapsed; and
- an event counter array for logging selected events detected in one or more of the address, control and data information, the performance monitor configured to load one or more entries in the event counter array into the even frequency array after a second defined period of time has elapsed.

13. The memory system of claim 12 wherein the performance monitor further comprises one or more trace arrays for recording one or more of the address, control and data information over time.

14. A memory controller for receiving and responding to memory access requests, the memory controller comprising:
- a memory interface for transferring one or more of address, control and data information between the memory controller and one or more hub devices via a memory bus; and
- a performance monitor for monitoring and reporting one or more of memory bus utilization and performance characteristics over defined intervals during system operation, the performance monitor comprising:
  - a bin counter for logging an elapsed time between related events, the performance monitor configured to transfer one or more entries in the bin counter into an event frequency array after a defined period of time has elapsed; and
  - a trace array for recording one or more of the address, control and data information over time, the performance monitor further configured for setting thresholds on event counters and bin counters, and the trace array is stopped when one or more of the thresholds is exceeded, thereby stopping the trace array upon indication of an unexpected event occurring.

15. A memory hub device comprising:
a memory interface for transferring one or more of address, control and data information between the memory hub device and a memory controller via a memory bus;
a memory device interface for communicating with memory devices; and
a performance monitor for monitoring and reporting one or more of memory bus utilization, memory device utilization, and performance characteristics over defined intervals during subsystem operation, the performance monitor comprising:
- a bin counter for logging an elapsed time between related events, the performance monitor configured to transfer one or more entries in the bin counter into an event frequency array after a first defined period of time has elapsed; and
- an event counter array for logging selected events detected in one or more of the address, control and data information, the performance monitor configured to load one or more entries in the event counter array into the even frequency array after a second defined period of time has elapsed.

16. The memory hub device of claim 15 wherein the performance monitor data is read using one or more reporting buses.

* * * * *